United States Patent
Nakai

(12) 
(10) Patent No.: US 6,480,332 B1
(45) Date of Patent: *Nov. 12, 2002

(54) DIFFRACTIVE OPTICAL ELEMENT AND OPTICAL SYSTEM HAVING THE SAME

(75) Inventor: Takehiko Nakai, Kawasaki (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/121,685

(22) Filed: Jul. 24, 1998

(30) Foreign Application Priority Data

Jul. 28, 1997 (JP) ............................................. 9-217103

(51) Int. Cl.$^7$ ................................................. G02B 5/18
(52) U.S. Cl. ........................ 359/566; 359/576; 359/569
(58) Field of Search ................................. 359/576, 566, 359/571, 569, 575

(56) References Cited

U.S. PATENT DOCUMENTS

| | | | |
|---|---|---|---|
| 5,044,706 A | 9/1991 | Chen | 359/357 |
| 5,737,113 A | 4/1998 | Kuramochi et al. | 359/259 |
| 5,847,877 A | * 12/1998 | Imamura et al. | 359/566 |

FOREIGN PATENT DOCUMENTS

| | | | |
|---|---|---|---|
| DE | 195 33 591 | 3/1996 | |
| JP | 4-213421 | 8/1992 | |
| JP | 6-324262 | 11/1994 | |
| JP | 9127322 | * 5/1997 | 29/2 |
| WO | WO 93/20464 | 10/1993 | |

OTHER PUBLICATIONS

M.W. Farn, et al., "Diffractive Doublet Corrected On–Axis at Two Wavelengths," Proceedings of the SPIE: International Lens Design Conference, vol. 1354 (Jun. 11–14, 1990), pp. 24–29.

C. Londoño, et al., "The Design of Achromatized Hybrid Diffractive Lens Systems," Proceedings of the SPIE: International Lens Design Conference, vol. 1354 (Jun. 11–14, 1990), pp. 30–37.

Patent Abstracts of Japan, Vol. 1997, No. 09 (JP 9–127322, May 16, 1997), Sep. 30, 1997.

* cited by examiner

Primary Examiner—Cassandra Spyrou
Assistant Examiner—Fayez Assaf
(74) Attorney, Agent, or Firm—Fitzpatrick, Cella, Harper & Scinto

(57) ABSTRACT

In a diffractive optical element having a diffraction grating formed at an interface between different substances, a total sum of values obtained by multiplying rates of change in refractive index due to temperature variations of the substances by a grating thickness of the diffraction grating is smaller than a useful wavelength.

11 Claims, 7 Drawing Sheets

DIFFRACTIVE OPTICAL ELEMENT AND OPTICAL SYSTEM HAVING THE SAME

BACKGROUND OF THE INVENTION

1. Field of the Invention

The present invention relates to diffractive optical elements, and more particularly to a diffractive optical element having such a grating structure that rays of a plurality of wavelengths or rays of a specific wavelength band concentrate at a specific order (a design order) of diffraction, and to an optical system having the diffractive optical element.

2. Description of Related Art

Heretofore, as one of the methods of correcting chromatic aberration of an optical system, there is known a method of combining two glass (lens) materials which differ in dispersion.

In contrast to the method of reducing chromatic aberration by combining glass materials, there is known another method, which is disclosed in the optical literature, such as "International Lens Design Conference (1990)", SPIE Vol. 1354, etc., and the specifications of Japanese Laid-Open Patent Applications No. HEI 4-213421 and No. HEI 6-324262 and U.S. Pat. No. 5,044,706. In the case of that method, chromatic aberration is corrected by means of a diffractive optical element which is provided with a diffraction grating for a diffracting action and is disposed on a lens surface or a part of an optical system. That method is based on a physical phenomenon that the direction in which chromatic aberration arises for a ray of light of a reference wavelength becomes opposite between a refractive surface and a diffractive surface in an optical system.

Further, the diffractive optical element of such a type can be arranged to produce an advantageous correcting effect, like an aspheric lens, on the aberration by varying the period of a periodic structure of its diffraction grating.

Here, compared with a refracting action of rays of light, while one ray of light remains one even after refraction at a lens surface, one ray of light is split into rays of a plurality of orders after diffraction at a diffractive surface.

Therefore, in using a diffractive optical element for a lens system, it is necessary to decide the grating structure in such a way as to cause a light flux of a useful wavelength region to concentrate at a specific order of diffraction (hereinafter referred to as a design order). With the light flux concentrating at the specific order, rays of diffraction light other than the light flux of the specific order have a low degree of intensity. When the intensity becomes zero, the rays of diffraction light would not exist.

In order to attain the above-stated feature, the diffraction efficiency of a ray of light of the design order must be sufficiently high. Further, in a case where there are some rays of light having diffraction orders other than the design order, these rays are imaged in a place different from the imaging place of the ray of light of the design order, and thus appear as flare light.

For an optical system using a diffractive optical element, therefore, it is important to pay sufficient heed to the spectral distribution of diffraction efficiency at the design order and the behavior of rays of diffraction light of orders other than the design order.

FIG. 12 shows a case where a diffractive optical element 1, which has a diffraction grating 3 and is composed of one layer on a base plate 2, is formed on a surface of an optical system. In this case, diffraction efficiency for a specific order of diffraction is obtained as shown in FIG. 13, which shows the characteristic of the diffraction efficiency. This diffractive optical element is made of plastic material which is PMMA (nd=1.4917 and vd=57.4). The grating thickness d is set at 1.07 $\mu$m. In FIG. 13, the abscissa axis of a graph indicates wavelength (nm) and the ordinate axis indicates the diffraction efficiency (%).

The diffractive optical element 1 is designed to have the diffraction efficiency become highest at the first order of diffraction (shown in a full line curve in FIG. 13) in the useful wavelength region (a wavelength of 530 nm and thereabout). In other words, the design order of the diffractive optical element 1 is the first order.

Further, FIG. 13 shows also the diffraction efficiency of a diffraction order near the design order, i.e., zero-order light and second-order light (first order +first order). As shown in FIG. 13, at the design order, the diffraction efficiency becomes highest at a certain wavelength (hereinafter referred to as a "design wavelength") and gradually decreases at other wavelengths. In this case, the design wavelength $\lambda$ is set at 530 nm. The lower portion of the diffraction efficiency obtained at the design order becomes diffraction light of other orders and comes to appear as flare light. Further, in a case where the optical system is provided with a plurality of diffractive optical elements, a drop in diffraction efficiency at wavelengths other than the design wavelength eventually causes a decrease in transmission factor.

A diffractive optical element having the structure capable of lessening the drop in diffraction efficiency is disclosed in Japanese Laid-Open Patent Application No. HEI 9-127321. More specifically, the diffractive optical element disclosed is constructed by laminating on a base plate a plurality of layers of different materials and forming a relief pattern of diffraction grating on an interface between the layers of different materials.

The diffractive optical element of the kind having a grating structure formed by laminating a plurality of layers on a base plate can be formed to have a high degree of diffraction efficiency by combining component layers in various manners. Some of such combinations, however, make the thickness of grating of the diffractive optical element thicker than in the case of an ordinary element composed of a single layer, because materials forming diffraction gratings at their boundary faces cannot be otherwise arranged to have a sufficiently large difference in refractive index. Such a combination that causes an increase in thickness of grating presents a problem in a case where the refractive index is caused to vary by temperature variations to lower the diffraction efficiency.

In the event of temperature variations, some of such combinations thus cause the diffraction efficiency of the diffractive optical element of this kind to become lower than that of a diffractive optical element composed of a single layer in a conventional manner.

BRIEF SUMMARY OF THE INVENTION

It is an object of the invention to provide a diffractive optical element, or an optical system having the diffractive optical element, which is arranged to be capable of keeping its diffraction efficiency not much degraded by changes of refractive index resulting from temperature variations.

To attain the above object, in accordance with a first aspect of the invention, there is provided a diffractive optical element having a diffraction grating formed at an interface between different materials, in which a total sum of values obtained by multiplying rates of change in refractive index due to temperature variations of the materials by a grating thickness of the diffraction grating is smaller than a useful wavelength.

In accordance with a second aspect of the invention, there is provided a diffractive optical element having diffraction gratings formed by a plurality of layers made of at least two kinds of materials of different dispersions to enhance diffraction efficiency of a specific order (design order) over an entire useful wavelength region, in which a total sum of values obtained by multiplying rates of change in refractive index due to temperature variations of the materials forming the respective layers by grating thicknesses of the respective diffraction gratings is smaller than a useful wavelength.

In accordance with a third aspect of the invention, there is provided a diffractive optical element having a first diffraction grating surface formed at a boundary between first and second layers made of materials of different dispersions and a second diffraction grating surface formed at a boundary between the second layer and air to enhance diffraction efficiency of a design order (specific order) over an entire useful wavelength region, in which, letting rates of change in refractive index due to temperature variations of the materials of the first and second layers be denoted by dn1/dt and dn2/dt, respectively, a grating thickness of a first diffraction grating formed at the first layer be denoted by d1, a grating thickness of a second diffraction grating formed at the second layer having the first and second diffraction grating surfaces be denoted by d2, and a value obtained by multiplying the rates of change in refractive index due to temperature variations by the grating thicknesses of the first and second diffraction gratings be denoted by φt, the value φt being expressed as follows:

$$\phi t=(dn1/dt)d1-(dn2/dt)d2$$

and letting an amount of temperature variations be denoted by Δt, the design order be denoted by m, and a useful wavelength be denoted by λ0, the diffractive optical element satisfies the following condition:

$$|\phi t \cdot \Delta t| < m \cdot \lambda 0/4.$$

In accordance with a fourth aspect of the invention, there is provided a diffractive optical element having diffraction gratings formed by a plurality of layers made of at least two kinds of materials of different dispersions to enhance diffraction efficiency of a design order (specific order) over an entire useful wavelength region, in which, letting a rate of change in refractive index due to temperature variations of the material of the L-th layer be denoted by dnoL/dt, a grating thickness of the diffraction grating formed on the L-th layer be denoted by dL, and a value obtained by multiplying the rate of change in refractive index due to temperature variations by the grating thickness of each diffraction grating be denoted by φt, the value φt being expressed as follows:

$$\phi t=(dno1/dt)d1\pm(dno2/dt)d2\pm \ldots \pm(dnoL/dt)dL$$

and letting an amount of temperature variations be denoted by Δt, the design order be denoted by m, and a useful wavelength be denoted by λ0, the diffractive optical element satisfies the following condition:

$$|\phi t \cdot \Delta t| < m \cdot \lambda 0/4.$$

Further, in the diffractive optical element according to one of the first to fourth aspects, the plurality of diffraction gratings include a diffraction grating in which a grating thickness thereof within one period monotonously decreases in one direction and a diffraction grating in which a grating thickness thereof within one period monotonously increases in the one direction.

In particular, among the plurality of layers, if the diffractive optical element has an optical shape (optical path length) formed to monotonously (monotonically) increase the grating thickness within one period, at least one dispersion of the materials of the layer formed to monotonously decrease the grating thickness is larger than at least one dispersion of the materials of the layer formed to monotonously increase the grating thickness.

Further, among the plurality of layers, if the diffractive optical element has an optical shape (optical path length) formed to monotonously decrease the grating thickness within one period, at least one dispersion of the materials of the layer formed to monotonously increase the grating thickness is larger than at least one dispersion of the materials of the layer formed to monotonously decrease the grating thickness.

Further, at least one of the plurality of layers is made of a plastic optical material or ultraviolet curable resin.

Further, the useful wavelength region is a visible spectrum.

Further, the plurality of layers are laminated on a base plate, and a layer which is in contact with the base plate, among the plurality of layers, is made of the same material as the material of the base plate.

Further, in the diffractive optical element according to one of the third and fourth aspects, the value of |φt·Δt| mentioned above is equal to or less than m/8 of the useful wavelength.

An optical system according to the invention uses the diffractive optical element arranged in accordance with one of the aspects of the invention as mentioned above.

The diffractive optical element according to the invention is usable particularly for an image forming optical system and an observation optical system.

The arrangement according to the invention is applicable to optical apparatuses and electronic apparatuses having the optical systems mentioned above.

The above and other objects and features of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

Figure 1:
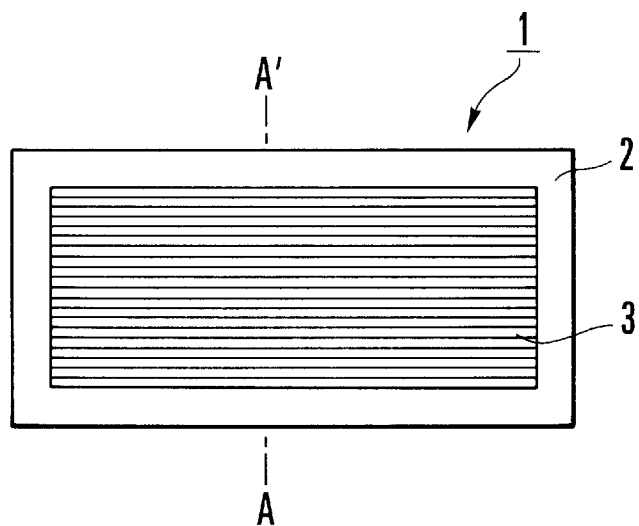
FIG. 1 is a front view showing essential parts of a diffractive optical element according to a first embodiment of the invention.

FIG. 1 is a front view showing a diffractive optical element according to a first embodiment of the invention. Referring to FIG. 1, the diffractive optical element 1 is composed of a lamination part 3 which is formed by laminating a plurality of layers on the surface of a base plate 2.

Figure 2:
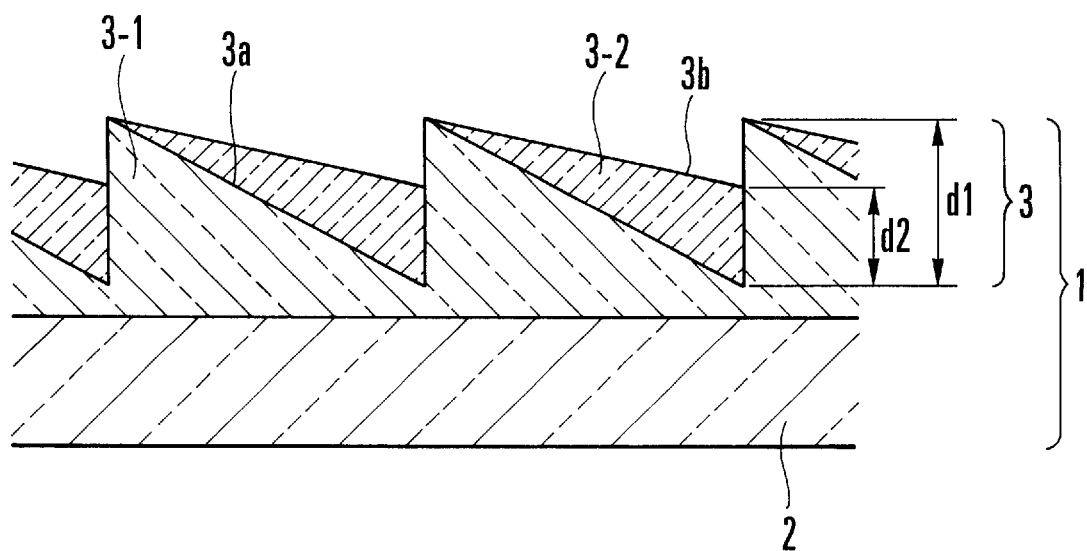
FIG. 2 is a sectional view showing essential parts of the diffractive optical element according to the first embodiment of the invention.

FIG. 2 is a sectional view of a part of the diffractive optical element taken along a line A–A' of FIG. 1. In FIG. 2, this part of the diffractive optical element is illustrated in an exaggerated shape in the direction of the depth of a grating (diffraction grating). The diffractive optical element according to the first embodiment is formed by laminating, on the base plate 2, a first layer 3-1 and a second layer 3-2 which are made of materials differing in dispersion (Abbe Number νd) from each other. A first diffraction grating surface 3a is formed at a boundary between the first layer 3-1 and the second layer 3-2, and a second diffraction grating surface 3b is formed at a boundary between the second layer 3-2 and air. Thus, a first diffraction grating 3-1 is formed by the first layer and the first diffraction grating surface 3a, and a second diffraction grating 3-2 is formed by the second layer, the first diffraction grating surface 3a which is in contact with the second layer and the second diffraction grating surface 3b.

Accordingly, the diffractive optical element according to the first embodiment has the structure composed of the first diffraction grating 3-1 and the second diffraction grating 3-2 which is formed on the first diffraction grating 3-1.

Further, according to the first embodiment, the first diffraction grating 3-1 and the second diffraction grating 3-2 are superimposed on each other in such a manner that the grating thickness d1 of the first diffraction grating 3-1 monotonously decreases within one period from the left to the right as viewed in FIG. 2 and the grating thickness d2 of the second diffraction grating 3-2 monotonously increases within one period also from the left to the right.

The diffractive optical element according to the first embodiment is characterized by a grating structure in which a plurality of layers made of at least two materials which differ from each other in dispersion are laminated on a base plate to form a diffraction grating by each layer. The grating structure is characterized in that a total sum of values obtained by multiplying the grating thickness of each diffraction grating by a rate of change in refractive index due to temperature variations of the material of each of the diffraction gratings is sufficiently small as compared with the useful wavelength.

Further, it is a feature of the first embodiment that the layers made of materials differing in dispersion form at least one pair of gratings, with the grating thickness of one layer monotonously increasing and that of the other monotonously decreasing within one period.

It is another feature of the first embodiment that, among the plurality of layers, if the diffractive optical element has an optical shape (optical path length) formed to monotonously increase the grating thickness within one period, at least one dispersion of the materials of the layer formed to monotonously decrease the grating thickness is larger than at least one dispersion of the materials of the layer formed to monotonously increase the grating thickness.

Further, among the plurality of layers, if the diffractive optical element has an optical shape (optical path length) formed to monotonously decrease the grating thickness within one period, at least one dispersion of the materials of the layer formed to monotonously increase the grating thickness is larger than at least one dispersion of the materials of the layer formed to monotonously decrease the grating thickness.

Figure 12:
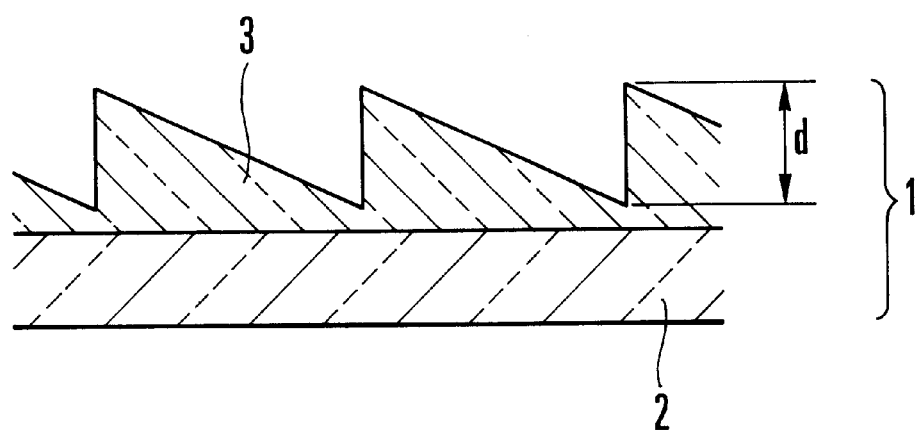
FIG. 12 is a sectional view showing essential parts of the conventional diffractive optical element.

A combination of materials of layers forming the first and second diffraction gratings 3-1 and 3-2 so as to give a high diffraction efficiency over a wide wavelength region will be described later. Before that description, the behavior in respect of the diffraction efficiency of the diffraction grating of the two-layer structure and the diffraction efficiency of the conventional combination of materials are described as follows. FIG. 12 shows a transmission-type diffractive optical element 1, which is arranged to be used in air. In order to obtain a maximum diffraction efficiency for a design wavelength $\lambda 0$ with the diffractive optical element of this type, the optical path length difference d0 between the crest and the trough of a diffraction grating is required to be integer times as much as the design wavelength, as expressed below:

$$d0 = (n0-1)d = m\lambda 0 \quad (1)$$

where n0 is the refractive index of the material at the wavelength $\lambda 0$, d is a grating thickness, and m is an order of diffraction.

In the case of the diffractive optical element of the two-layer structure, since two diffraction gratings which extend in opposite directions overlap each other to form one diffractive optical element, a conditional expression similar to the formula (1) becomes as follows:

$$(n01-1)d1 - (n02-1)d2 = m\lambda 0 \quad (2)$$

where grating thickness d1 and d2 of the first and second layers are absolute values, n01 is the refractive index at the wavelength $\lambda 0$ of the material of the first layer, and n02 is the refractive index at the wavelength $\lambda 0$ of the material of the second layer.

Then, the diffraction efficiency η can be expressed as follows:

$$\eta = \text{sinc}^2[\{(n01-1)d1-(n02-1)d2\}/m\lambda 0 - 1] = \text{sinc}^2(\phi 0/m\lambda 0) \quad (3)$$

wherein $\phi 0$ represents a phase error which is expressed as $\phi 0 = (n01-1)d1 - (n02-1)d2 - m\lambda 0$. Further, it can be expressed in a function as "$\text{sinc}(x) = \sin(nx)/nx$".

Therefore, if the formula (2) is satisfied for the whole useful wavelength region, the phase error φ0 in the formula (3) becomes "0". Then, the diffraction efficiency η can be maximized for all useful wavelengths, as it can be expressed as η=sinc$^2$[0]=1.

The grating shape in the grating structure of the diffractive optical element 1 according to the first embodiment is next described on the basis of actual values. The useful wavelength region is assumed to be in a visible spectrum and the design order of the diffraction grating is assumed to be + first order (m=1). The base plate 2 and the first layer 3-1 which forms the first diffraction grating 3-1 is formed with a low moisture absorbing acrylic resin (nd=1.4970, vd=56.0). The second layer 3-2 which forms the second diffraction grating 3-2 is formed with a material called "Immersion Liquid I. L1160" (nd=1.4820, vd=42.3) which is a product of Cargille Laboratories Inc.

The refractive index n1 of the material of the first layer is 1.49911, 1.50810 and 1.49432 at the e line (wavelength=0.546 μm), the g line (wavelength=0.436 μm and the C line (wavelength=0.656 μm), respectively.

The refractive index n2 of the material of the second layer is, on the other hand, 1.48480, 1.49692 and 1.47881 at the e, g and C lines, respectively. Hence, the formula (2) for these wavelengths becomes as follows:

$$(1.49911-1)d1-(1.48480-1)d2=0.54607 \quad (4)$$

$$(1.50810-1)d1-(1.49692-1)d2=0.435835 \quad (5)$$

$$(1.49432-1)d1-(1.47881-1)d2=0.65627 \quad (6)$$

Since there are only two variables for the three formulas, it is impossible to obtain any thickness of the material that satisfies all of these three formulas.

For example, if the grating thicknesses d1 and d2 are obtained from the formulas (4) and (5) by choosing the e and g lines, the results become d1=35.4 μm and d2=35.4 μm. With these thickness values substituted into the left side of the formula (6), the result becomes 0.549, which indicates that the optical path length difference is 0.549 μm. This optical path length difference of 0.549 μm is shorter than the wavelength 0.65627 μm of the C line in the formula (6). This indicates a slight deviation from the diffraction efficiency maximizing condition. The diffraction efficiency thus drops to a value of η=sinc$^2$(0.549/1*0.656−1)=98% or thereabout in the formula (3). The diffraction efficiency is obtained in this manner, for each wavelength within the useful wavelength region, from the relation between the optical path length difference and the wavelength.

Figure 13:
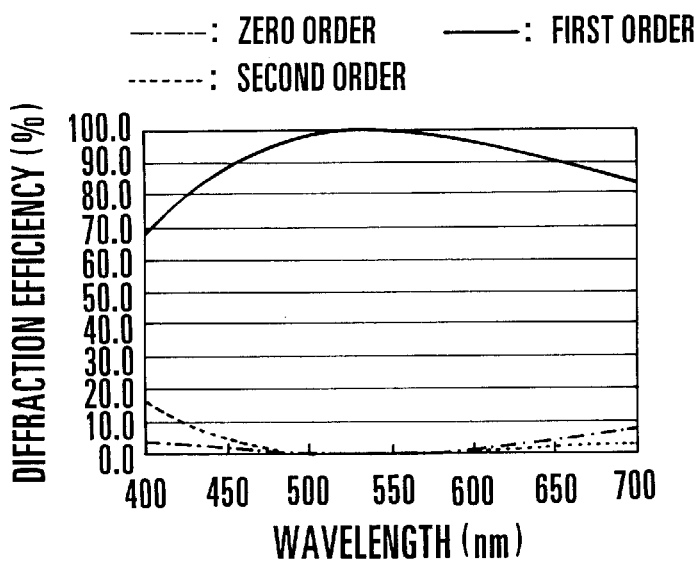
FIG. 13 shows the diffraction efficiency of the conventional diffractive optical element.
Figure 14:
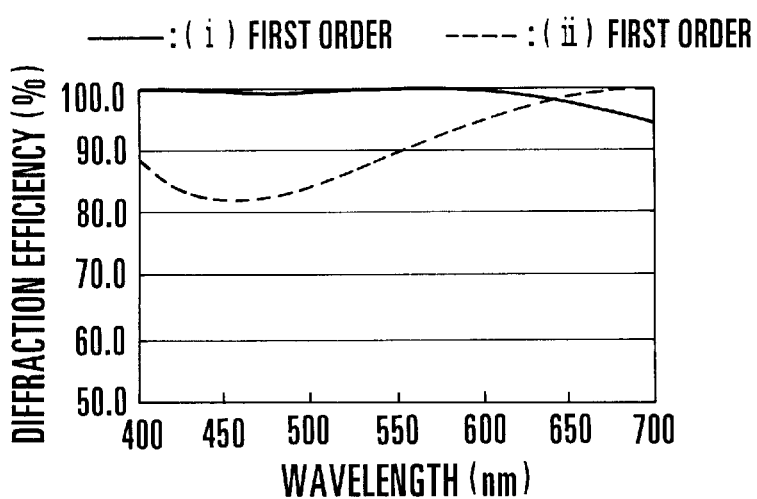
FIG. 14 shows the diffraction efficiency obtained at the design order of diffraction of the conventional diffractive optical element.

FIG. 14 shows the diffraction efficiency obtained in the visible spectrum with the above-stated grating thicknesses d1 and d2. In FIG. 14, a solid line curve (i) shows the diffraction efficiency of the diffractive optical element 1 obtained while it is in an initial state in which the above-stated relation is satisfied. In the case of FIG. 14, the diffraction efficiency maximizing condition is satisfied to make the diffraction efficiency 100% for the wavelengths of the g and e lines. As for the wavelength of the C line, the diffraction efficiency drops to 98% or thereabout. However, compared with the diffraction efficiency of the conventional diffraction grating formed by one layer which drops to 68% at 400 nm as shown in FIG. 13, a sufficiently high diffraction efficiency is maintained over the whole visible spectrum according to the first embodiment.

Figure 15:
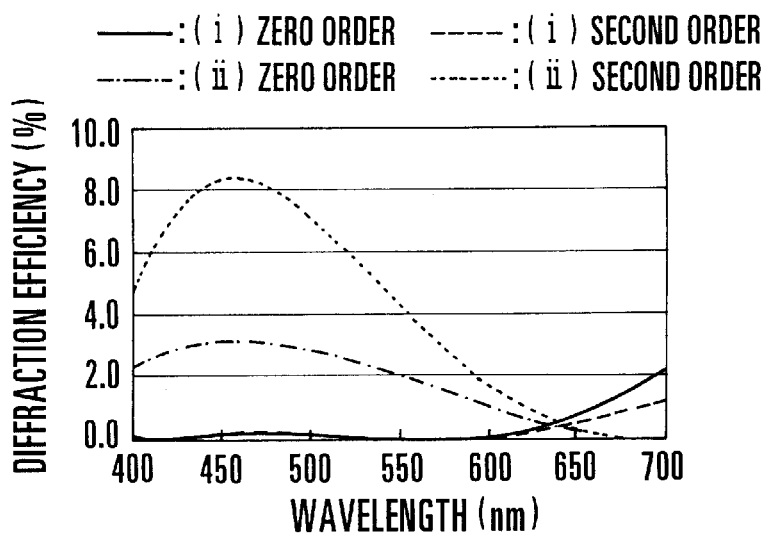
FIG. 15 shows the diffraction efficiency obtained at the order near the design order of the conventional diffractive optical element.

FIG. 15 shows the diffraction efficiency obtained at the order near the design order of diffraction, including zero order and second order. In FIG. 15, a curve (i) shows the diffraction efficiency obtained around the design order (including the zero and second orders) in the initial state. As apparent from FIG. 15, diffracted light at the order near the design order is greatly suppressed down to a value less than 2% over the whole region.

Variations of the diffraction efficiency which take place when the refractive indices of the materials of the first and second layers are caused to change by temperature variations are next described. The amount of change in refractive index n of each material to be caused by temperature t (a rate of change in refractive index due to temperature variations) is assumed to be dn/dt, and the amount of change in temperature is assumed to be Δt. The refractive index of each material is caused to change by temperature variations in a manner as follows: n01t=n01+(dn01/dt)*Δt, and n02t=n02+(dn02/dt)*Δt.

Therefore, the diffraction efficiency ηt obtained after a change of temperature can be expressed, on the basis of the formula (3), as follows:

$$\eta t = \text{sinc}^2[\{(n01t-1)d1-(n02t-1)d2\}/m\lambda 0 - 1] = \text{sinc}^2[\{(n01-1)d1-(no2-1)d2\}/m\lambda$$

$$0 - 1 + \{(dn01/dt)*d1-(dn02/dt)*d2)\}\Delta t/m\lambda 0] = \text{sinc}^2(\phi 0/m\lambda 0 + \phi t \Delta t/m\lambda 0) \quad (7)$$

In the formula (7) above, the term of phase error φ0={(n01−1)d1−(n02−1)d2}−mλ0 is a value determined by the shape of the initial stage and is not dependent on the change of temperature.

Therefore, in order to suppress the fluctuations of diffraction efficiency due to temperature variations, it is necessary to make the value of the term φt={(dn01/dt)*d1−(dn02/dt)*d2} small.

The amount of change of diffraction efficiency taking place when the temperature changes by 10 degrees, with the materials mentioned above employed, is as follows:

The rates of change in refractive index of the materials of the first and second layers are dn01/dt=1.2×10$^{-4}$ and dn02/dt=−3.85×10$^{-4}$.

In this instance, the wavelength dependency of the rate of change in refractive index due to temperature variations is assumed to be negligible for the sake of simplification of description. Since the thickness of each grating is set to satisfy the formulas (4) and (5), the phase error φ0 is zero (φ0=0) for the g and e lines.

On the other hand, the value φt becomes $$\phi t = (1.2 \times 10^{-4} * 35.4 - (-3.85 \times 10^{-4}) * 35.4 = 0.0094.$$

Therefore, the diffraction efficiency ηt for the g and e lines becomes as follows:

$$\eta t = \text{sinc}^2(0.0094*10/1*0.435835) = 0.857$$

$$\eta t = \text{sinc}^2(0.0094*10/1*0.54607) = 0.907$$

As shown above, the diffraction efficiency for the g line greatly drops by 14% or thereabout while it is at least as high as 97% over the whole wavelength region in the initial state.

In FIGS. 14 and 15, a curve (ii) represents the diffraction efficiency obtained after a change of temperature. In contrast with the diffraction efficiency obtained in the initial state as represented by the curve (i), the diffraction efficiency after the change of temperature as represented by the curve (ii) fails to attain the main object which is to obtain a high diffraction efficiency by means of the multilayer diffraction grating. However, an attempt to suppress the change of diffraction efficiency to 2% or less would require the allowable change of temperature to be limited to 3.6 degrees. Such a limitation necessitates temperature control by means of a special device. The use of such a device is, however, not easy for the lenses of ordinary cameras, video cameras and business machines.

The materials which are to be used for each layer of the first embodiment and effective in suppressing the drop of diffraction efficiency caused by the changes of refractive index are next described. The selection of materials with respect to the initial performance of the diffractive optical element is determined to satisfy the relation indicated by the formula (2), as much as possible.

To simplify the description, the diffractive optical element composed of two layers as shown in FIG. 2 is used for the following description. The diffraction efficiency attainable when the refractive indices of the materials are changed by a change of temperature is expressed by the above formula (7). In a case where the initial performance is good, the value $\phi 0$ can be considered to be $\phi 0 \approx 0$. In order to lessen the fluctuations of the diffraction efficiency, the value of "$\phi t \Delta t$" in the formula (7) must be sufficiently small. The value $\phi t$, therefore, must be small.

The first embodiment is characterized in that the diffractive optical element is composed of two layers of different materials which are combined to make the value $\phi t$ small.

The allowable value of the value $\phi t$ is first described. In a case where the fluctuations of diffraction efficiency are to be not exceeding 2% over the whole useful wavelength region, for example, the allowable value of the value $\phi t$ is obtained as follows. Assuming that the amount of change in temperature $\Delta t$ is 30 degrees, the value of "$\phi t/m\lambda 0$" must be not greater than $2.6 \times 10^{-3}$. Then, with the design order of the diffraction grating assumed to be the first order (m=1) and the useful wavelength region assumed to be the visible spectrum from 0.4 to 0.7 $\mu$m, the combination of the materials and the grating thickness must be decided to have the value $\phi t$ not exceeding $1.04 \times 10^{-3}$ for the short wavelength of 0.4 $\mu$m and $1.82 \times 10^{-3}$ for the long wavelength of 0.7 $\mu$m.

A practical combination of the materials is next described as follows. Most of the optical materials to be used within the visible spectrum are so-called optical glass. If both of the two different materials are selected from the optical glass materials, the amounts of change in refractive index "dn01/dt" and "dn02/dt" themselves are small in the order of only $10^{-6}$. Therefore, in that case, the above-stated depth of grating of 35 $\mu$m or thereabout gives the value $\phi t$ at a sufficiently small value.

However, it is not easy in terms of machining to have both the two different materials selected from optical glass materials. To facilitate manufacturing processes, therefore, it is preferable to have at least one of the two different materials selected from among plastic optical materials or ultraviolet curable resin materials or the like. A combination wherein an optical glass material is used as one of the two different materials and a plastic optical material or an ultraviolet curable resin is used for the other is first described below.

The amount of change in refractive index "dn/dt" of the plastic optical materials is $-1.2 \times 10^{-4}$ or thereabout in general. Compared with this value, the amount of change in refractive index "dn/dt" of the optical glass is sufficiently small. Therefore, in the case of this combination, the effect of a change in refractive index of the glass material is negligible. In the case of a combination where an optical glass material is used for the first layer and a plastic optical material is used for the second layer, for example, the combination can be made to have the value "$\phi t \approx (-dn02/dt) \times d2$" less than the desired value mentioned in the foregoing. Such a value is obtainable to suppress the drop in diffraction efficiency due to temperature variations to a degree not exceeding 2% by arranging a diffraction grating on the side of the plastic optical material layer to have a grating thickness "d" not exceeding 8.5 $\mu$m.

In a case where plastic optical materials or ultraviolet curable resin materials are used for both of the two layers, the two layers which are of different kinds cannot be arranged to have a sufficiently large difference in refractive index between them. Therefore, it is not easy to make the grating thickness of each diffraction grating thin. Hence, it is desirable to find such a combination of the materials that makes the value $\phi t$ not exceeding a desired value by having the amounts of changes in refractive index of the two layers adequately offset each other.

For example, assuming that the values dn/dt (the amounts of change in refractive index, i.e., the rates of change in refractive index, due to temperature variations) of the two materials of two different kinds are the same in value and also in sign and that the grating thicknesses d1 and d2 are equal to each other in depth, the drop of diffraction efficiency due to temperature variations can be perfectly made to be zero. Further, if the difference in depth between the grating thicknesses d1 and d2 does not exceed 8.5 $\mu$m, it is possible to have the drop of diffraction efficiency due to temperature variations suppressed to a value not exceeding 2% in the same manner as in the case of using a plastic optical material or an ultraviolet curable resin material for only one of the layers.

Figure 3:
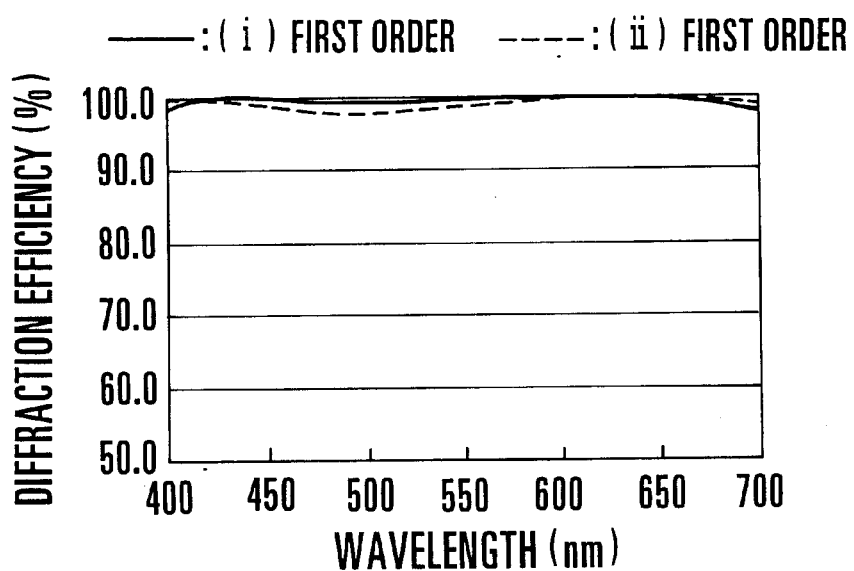
FIG. 3 shows the diffraction efficiency obtained at the design order of diffraction of the diffractive optical element according to the first embodiment of the invention.
Figure 4:
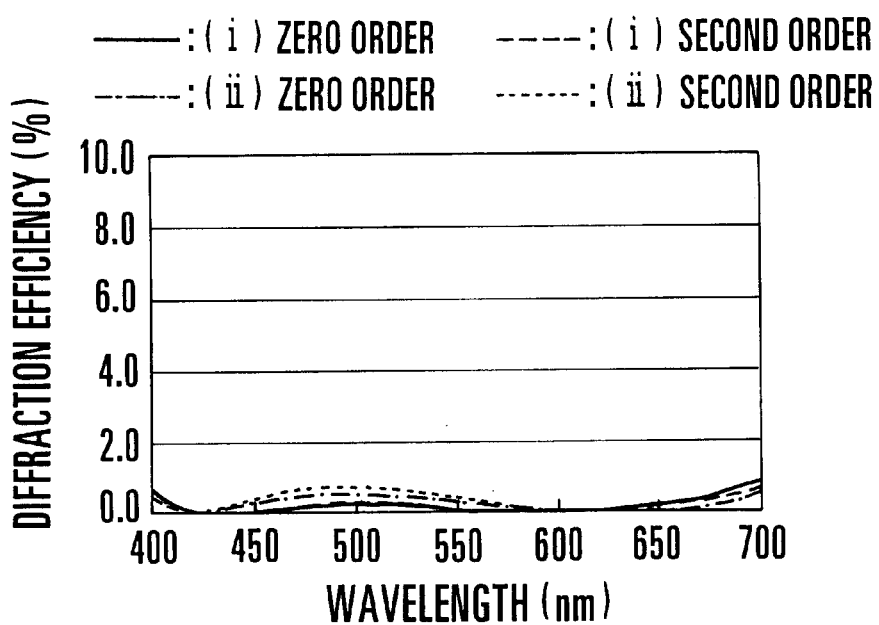
FIG. 4 shows the diffraction efficiency obtained at the order near the design order of the diffractive optical element according to the first embodiment of the invention.

FIGS. 3 and 4 are graphs showing the diffraction efficiency obtained by using a diffractive optical element arranged according to the invention. FIG. 3 shows the diffraction efficiency for the diffracted light of + first order, which is the design order. FIG. 4 shows the diffraction efficiency for the diffracted light of zero and second orders, which are near the design order.

In the case of the diffractive optical element according to the first embodiment, a plastic optical material PMMA (nd=1.4917, vd=57.4) is used for the first layer, and another plastic optical material PS (nd=1.5918, vd=31.1) is used for the second layer. The diffractive optical element is formed by laminating these layers as shown in FIG. 2.

In this case, the grating thickness of the first layer is 18.9 $\mu$m and that of the second layer is 14.7 $\mu$m. Both of the first and second layers are made of plastic materials. Their rates of change in refractive index due to temperature variations are about equal to each other and are approximately at dn/dt=$-1.2 \times 10^{-4}$.

Curves (i) and (ii) in FIGS. 3 and 4 represent the diffraction efficiency, the curve (i) showing the diffraction efficiency obtained in the initial state and the curve (ii) showing the diffraction efficiency obtained after temperature variations, in the same manner as in the case of FIGS. 14 and 15 described in the foregoing. However, in this case, the amount of change of temperature $\Delta t$ is assumed to be 30 degrees. According to the conventional combination of materials which is made without paying any heed to the adverse effect of temperature variations, the diffraction efficiency is much degraded by a change of temperature of only 10 degrees as shown in FIG. 14. Compared with the conventional combination, the rate of change in diffraction efficiency of the combination of materials of the first embodiment is only 2% and less, which shows an adequate suppressing effect.

While the first embodiment has been described with respect to a combination of the materials for suppressing the rate of change in diffraction efficiency to 2% and less, the following describes an allowable range of the value "$\phi t \Delta t$" which is a factor of diffraction efficiency fluctuations due to temperature variations.

The first embodiment is arranged on the premise that the value of $\phi 0$ which represents the initial performance becomes sufficiently small. In the case of a diffractive optical element which is shown in FIG. 12 for comparison and is composed of a single layer, the initial value of $\phi 0$ does not become small. In the case of FIG. 12, the refractive index of the PMMA employed as the material of the layer is 1.50798 at the wavelength of 400 nm and 1.48787 at the wavelength of 700 nm. Therefore, the value of $\phi 0$ can be expressed as follows:

$$\phi 0 = 0.4 = (1.50798-1)1.07 - 1*0.4 = 0.359 \text{ m}\lambda 0$$

$$\phi 0 = 0.7 = (1.48787-1)1.07 - 1*0.7 = -0.254 \text{ m}\lambda 0$$

The value of $\phi 0$ of the above-stated diffractive optical element of a single layer shows that, if the absolute value of "$\phi t \Delta t$" of the diffractive optical element of the invention can be arranged to be not exceeding the value of "$m\lambda 0/4$", its diffraction efficiency never becomes worse than the initial state of the single-layer diffractive optical element, even in the event of temperature variations, so that the advantage of the invention can be attained.

It is preferable to have the absolute value of "$\phi t \Delta t$" suppressed to a value not exceeding "$\frac{1}{8} m\lambda 0$", because the amount of fluctuations of diffraction efficiency taking place in the event of temperature variations then can be suppressed to a rate not exceeding 5%.

As described above, a feature of the first embodiment lies in that the materials are combined in such a way as to lessen the sum of the values $(dn/dt)*d$ which are products of the rates of change in refractive index $dn/dt$ of the materials due to temperature variations and the grating thickness d.

According to the structural arrangement, even in the event of a change of temperature by about 30 degrees, the fluctuations of the diffraction efficiency can be adequately suppressed, so that the diffractive optical element can be used for the lens system of an ordinary camera, a video apparatus, a business machine, or the like without any temperature control mechanism.

A diffractive optical element according to a second embodiment of the invention is next described.

Figure 5:
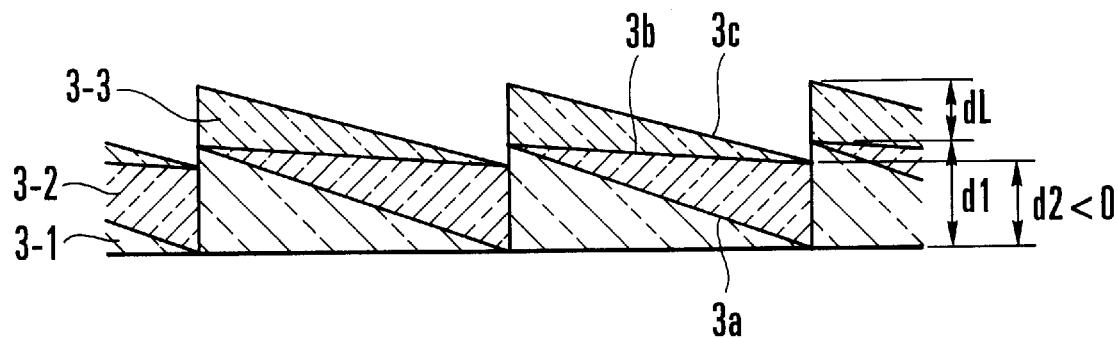
FIG. 5 is a sectional view showing essential parts of a diffractive optical element according to a second embodiment of the invention.

The first embodiment described above has a combination of two layer materials. In accordance with the invention, however, the number of layers of the diffractive optical element is not limited to two. The grating shape of the diffractive optical element according to the invention may be composed of a plurality of layers 3-1, 3-2 and 3-3 as shown in FIG. 5. Therefore, a multilayer diffractive optical element composed of more than two layers is described as follows.

Figure 6:
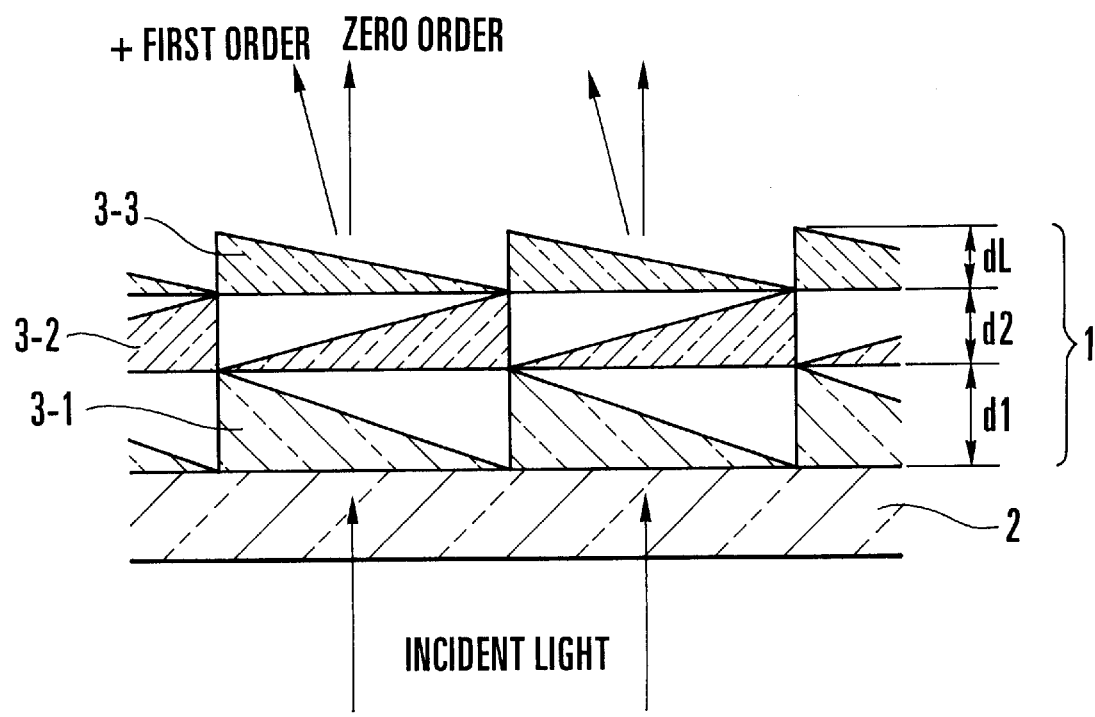
FIG. 6 is a conceptual diagram showing the diffractive optical element according to the second embodiment.

To simplify the description, the diffractive optical element is assumed to have a diffraction grating shape composed of an L number of layers with each layer separated from another by air, as shown in FIG. 6. FIG. 5 shows a structure in which diffraction grating surfaces 3a, 3b and 3c are arranged to be in tight contact with each other to jointly act as one diffraction grating. If reflection by the grating boundary surfaces is ignorable, the optical actions of the diffractive optical elements of FIGS. 5 and 6 are identical with each other. In this case, the grating thickness is assumed to be a difference between the maximum thickness and the minimum thickness within one period of each diffraction grating.

Assuming that the refractive index of the L-th layer obtained at the wavelength $\lambda 0$ is $n0L$, a formula which corresponds to the formula (2) becomes as follows:

$$(n01-1)d1 \pm (n02-1)d2 \pm \ldots \pm (n0L-1)dL = m\lambda 0 \tag{8}$$

Then, assuming that $$\phi 0 = (n01-1)d1 \pm (n02-1)d2 \pm \ldots \pm (n0L-1)dL - m\lambda 0,$$

the diffraction efficiency $\eta$ of the whole diffractive optical element becomes as expressed below:

$$\eta = \text{sinc}^2(\phi 0/m\lambda 0) \tag{9}$$

Referring to FIG. 6, in respect of the direction of diffraction, if the diffraction to the left from the zero-order diffracted light is assumed to be a positive diffraction order, the sign "$\pm$" in the formula (8) becomes as follows. A grating shape in which the thickness of grating decreases from the left to the right as viewed in FIG. 6, i.e., that of the first and third layers, has the positive (+) sign. Another grating shape in which the thickness of grating increases from the left to the right, i.e., that of the second layer, has the negative (−) sign.

Next, with a rate of change in refractive index due to temperature variations of the material of the L-th layer assumed to be $dn0L/dt$ and the amount of change in temperature assumed to be $\Delta t$, the change in refractive index of each layer due to temperature variations can be expressed as follows: $n0Lt = n0L + (dn0L/dt)*\Delta t$. Therefore, the diffraction efficiency $\eta t$ is caused by temperature variations to become as expressed below:

$$\eta t = \text{sinc}^2[\{(n01t-1)d1 \pm (n02t-1)d2\} \pm \ldots$$
$$\pm (n0Lt-1)dL - m\lambda 0\}/m\lambda 0] = \text{sinc}^2[\{(n01-1)d1 \pm (n02-1)d2 \pm \ldots$$
$$\pm (n0L-1)dL - m\lambda 0\}/m\lambda 0 + \{(dn01/dt)*d1 \pm (dn02/dt)*d2 \pm \ldots$$
$$\pm (dn0L/dt)*dL\}\Delta t/m\lambda 0] = \text{sinc}^2\{(\phi 0/m\lambda 0) + \phi t\Delta t/(m\lambda 0)\} \tag{10}$$

wherein $$\phi t = \{(dn01/dt)*d1 \pm (dn02/dt)*d2 \pm \ldots \pm (dnoL/dt)*dL\}.$$

In the formula above, the "$\pm$" sign selection is made according to the increase or decrease in the grating thickness. Therefore, the combination of $dn/dt$ (the rate of change in refractive index due to temperature variations) of the material and the grating thickness of the multilayer diffraction grating composed of two or more layers is decided also so as to make the value of $\phi t$ less than a desired value, in the same manner as the two-layer diffraction grating described in the foregoing.

Figure 7:
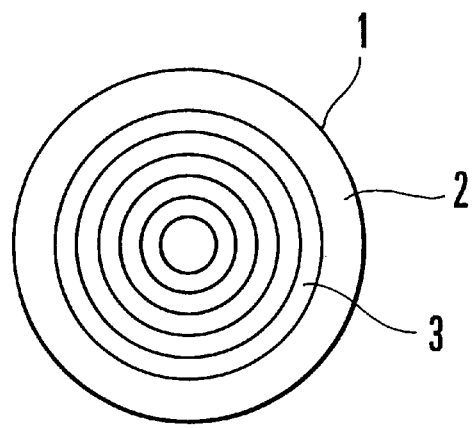
FIG. 7 shows by way of example a modification of the diffractive optical element in the second embodiment.

The description given above is limited to the shape of one period of diffraction grating. However, it is known that the diffraction efficiency of a diffraction grating is basically not affected by the pitch of the diffraction grating. Thus, the arrangement of the second embodiment not only applies to the one-dimensional diffraction grating shown in FIG. 1 but also applies to all diffractive optical elements of any shape of grating pitch, for example, such a diffractive optical lens as shown in FIG. 7.

Figure 8:
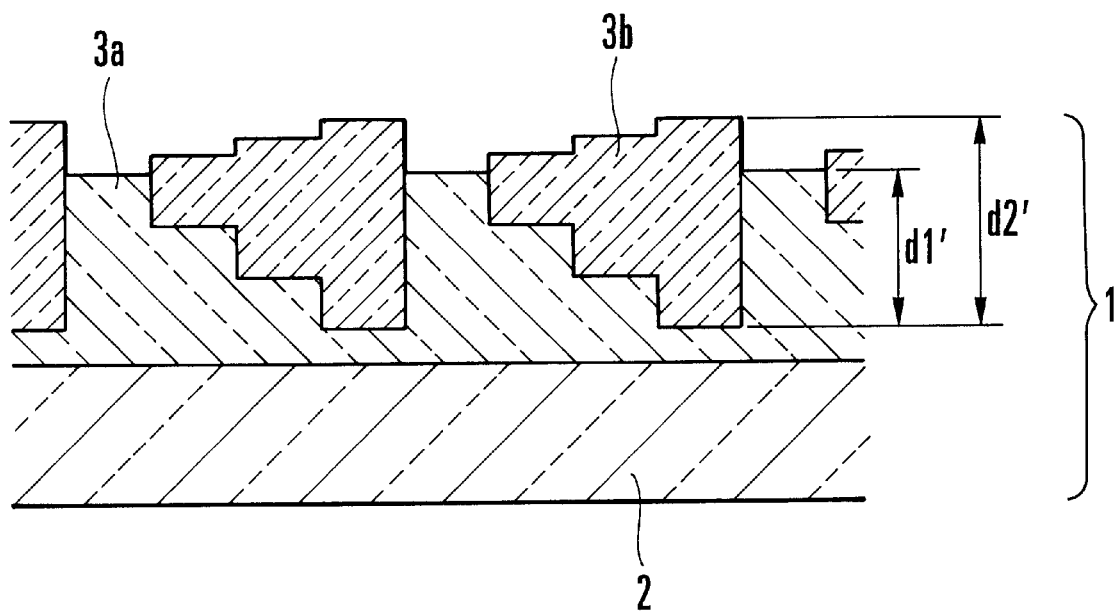
FIG. 8 shows another example of modification of the diffractive optical element in the second embodiment.

As for the sectional shape of grating, the arrangement of the second embodiment is applicable to a stepped shape such as the one shown in FIG. 8. The invention, therefore, can be carried out by using any known grating shape. However, in the case of the stepped shape shown in FIG. 8, the actual thicknesses d1' and d2' of grating are in the following relation to the grating thicknesses d1 and d2 of the above-stated kinoform:

$$d1' = d1*(N-1)/N$$

$$d2' = d2*(N=1)/N$$

where N represents the number of grating steps of the stepped diffraction grating. In the case of the stepped diffraction grating, the actual grating thickness d' differs from the grating thickness d which is used for determining an optical path length difference.

In the case of each of the first and second embodiments described above, the diffractive optical element has a diffraction grating formed on a flat plate. However, the same advantageous effect can be attained by forming the diffraction grating on a curved lens surface instead of on the flat plate.

Further, while the second embodiment is arranged to form the first diffraction grating on the base plate, the arrangement may be changed to form the base plate and the first diffraction grating together into one body by molding by using one and the same material.

In the case of the second embodiment, the design order of diffraction is arranged to be the first order. However, the design order is not limited to the first order. The same advantageous effect is attainable on the concept of the invention by setting the design order to the second order of diffraction or to a diffraction order higher than the second order, in such a way as to have a design wavelength as desired at the higher diffraction order.

Next, a diffractive optical element according to a third embodiment of the invention is described as follows. In the case of each of the first and second embodiments, the grating thickness of the thinnest part of the layer forming the second diffraction grating is zero. In this structure, the second diffraction grating is divided at every grating pitch. In the case of manufacture by molding, however, this shape makes it difficult to peel off and transfer the second diffraction grating from a mold.

Figure 9:
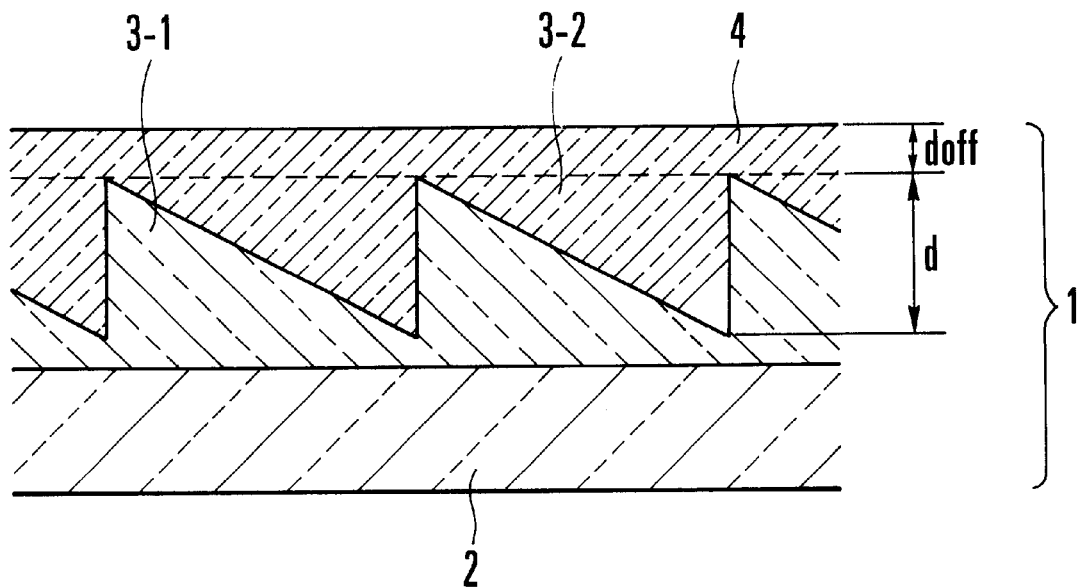
FIG. 9 is a sectional view showing essential parts of a diffractive optical element according to a third embodiment of the invention.

To solve this problem, the third embodiment is arranged as shown in FIG. 9. Referring to FIG. 9, a flat part 4 which is made of the same material as the second diffraction grating 3-2 and has a uniform thickness "doff" is added to the second diffraction grating 3-2 in such a way as to cover the whole area of the diffractive optical element. This structural arrangement makes it easier to peel the second diffraction grating 3-2 off the mold in the case of manufacture by molding.

Figure 10:
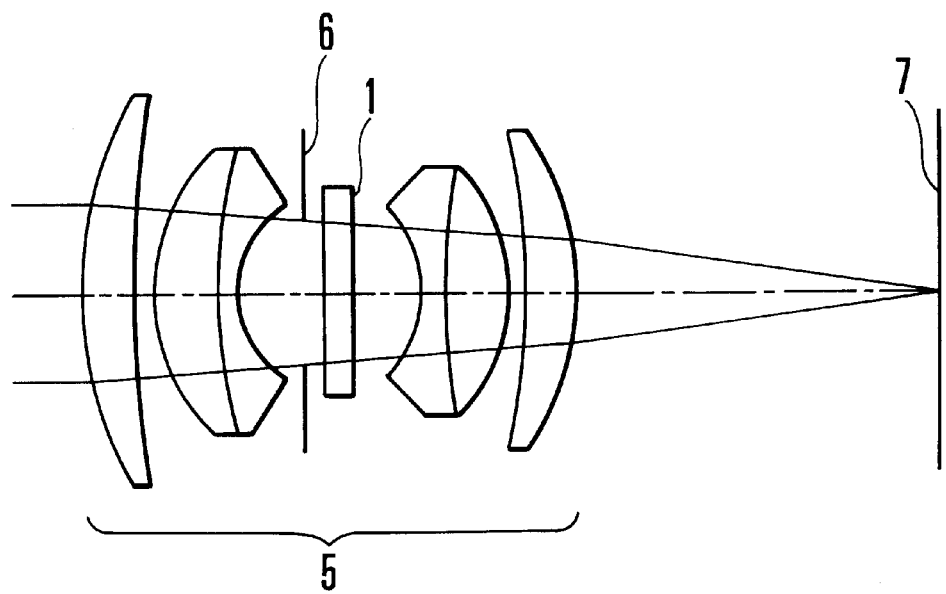
FIG. 10 schematically shows an optical system using a diffractive optical element according to a fourth embodiment of the invention.

FIG. 10 shows, as a fourth embodiment of the invention, an optical system using a diffractive optical element arranged according to the invention. Referring to FIG. 10, which is a sectional view of the photo-taking optical system for cameras, etc., a photo-taking lens 5 contains therein a diaphragm 6 and the diffractive optical element 1 which is a flat shape. Reference numeral 7 denotes a film which is used as an image forming plane.

In a case where the diffractive optical element according to the fourth embodiment is adapted for taking color images, the diffractive optical element is arranged as follows. In this case, for peak wavelengths of photosensitive layers of a color film, relations corresponding to the formulas (4), (5) and (6) are obtained in the same manner as described in the foregoing.

In the case of FIG. 10, the diffractive optical element 1 is provided on a flat glass surface in the neighborhood of the diaphragm 6. However, according to the invention, the position of the diffractive optical element 1 is not limited to this position. The diffractive optical element 1 may be provided on a curved lens surface. It is also possible to have a plurality of diffractive optical elements disposed inside the photo-taking lens.

In the case of the fourth embodiment, the invention is applied to a photo-taking lens of a camera. However, the diffractive optical element is applicable not only to photo-taking lenses of cameras but also to those of video cameras, image scanners of business machines, reader lenses of digital copying machines, etc.

Figure 11:
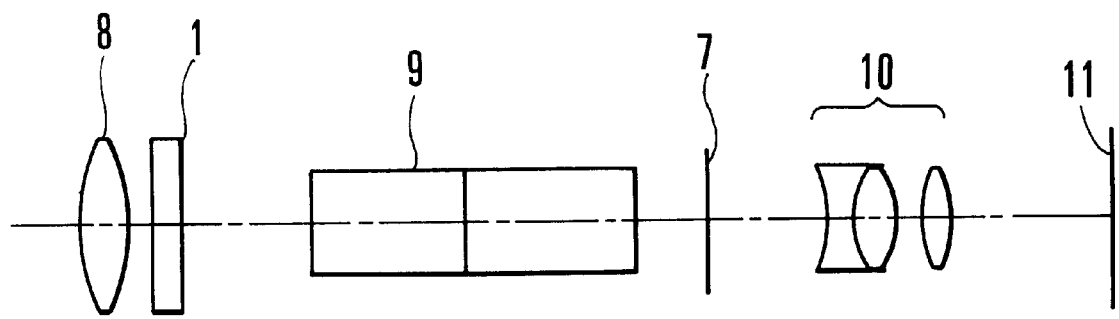
FIG. 11 schematically shows an optical system using a diffractive optical element according to a fifth embodiment of the invention.

FIG. 11 schematically shows, as a fifth embodiment of the invention, an optical system using a diffractive optical element arranged according to the invention. FIG. 11 is a sectional view of an observation optical system of, for example, a binocular or the like. The illustration of FIG. 11 includes an objective lens 8 for forming an object image, an image inverting prism 9 for converting the object image into an erecting image, an eyepiece lens 10, an evaluation plane (pupil plane) 11, and the diffractive optical element 1. The diffractive optical element 1 is provided for correcting chromatic aberration of the objective lens 8 taking place on an image forming plane 7.

In the fifth embodiment, the diffractive optical element 1 is disposed on the side of the objective lens 8. However, according to the invention, the position of the diffractive optical element 1 is not limited to this position. The same advantageous effect is attainable by arranging the diffractive optical element 1 in some other suitable position such as on the surface of the prism 9 or within the eyepiece lens 10. With the diffractive optical element 1 disposed closer to the object side than the image forming plane 7, it gives an abating effect on a chromatic aberration caused solely by the objective lens 8. Therefore, in the case of a system of observation with the eye, it is at least preferable to have the diffractive optical element 1 disposed on the side of the objective lens 8.

In the case of the fifth embodiment described above, the invention is applied to a binocular. The arrangement of the fifth embodiment is, however, applicable not only to a binocular but also to a terrestrial telescope, an astronomical telescope or the like. The same advantageous effect is attainable also by applying the arrangement to an optical viewfinder of a lens-shutter type camera, a video camera or the like.

Each of the embodiments described above is arranged to form a diffractive optical element to have diffraction gratings of two or more layers. The materials of each of these layers are selected in apposite combination with the grating thickness, so that a high diffraction efficiency always can be obtained over the whole useful wavelength region without having the diffraction efficiency deteriorated by changes in refractive index due to temperature variations.

The use of the diffractive optical element for a photo-taking lens obviates the necessity of arranging a special temperature control mechanism within the lens system. Since desired characteristics can be obtained under the same operating conditions as those of an ordinary refractive lens, the use of the diffractive optical element gives a photo-taking lens of a high degree of accuracy at a low cost.

Further, the use of the diffractive optical element for an observation optical system obviates the necessity of arranging any special temperature control mechanism within the optical system in obtaining desired characteristics under the same operating conditions as those of an ordinary refractive system. In accordance with the invention, therefore, an observation optical system of a high degree of accuracy can be obtained at a low cost.

What is claimed is:

1. A diffractive optical element having a first diffraction grating surface formed at a boundary between first and second layers made of materials of different dispersions and a second diffraction grating surface formed at a boundary between the second layer and air to enhance diffraction efficiency of a design order over a wavelength region, wherein at least one of the layers is made of a plastic resin material, wherein, rates of change in refractive index due to temperature variation of the materials of the first and second layers are dn1/dt, respectively, a thickness of a first diffraction grating formed by the first layer is d1, a thickness of a second diffraction grating formed by the second layer having the first and second diffraction grating surfaces is d2, and wherein said diffractive optical element satisfies the following conditions:

$\phi t = (dn1/dt)d1 - (dn2/dt)d2$ $\Delta t = 30$ degrees wherein m is the design order, $\lambda 0$ is a predetermined wavelength in the wavelength region, and $\phi t$ is a sum of values obtained by multiplying the rates of change in refractive index due to temperature variation $\Delta t$ by the grating thicknesses of the first and second diffraction gratings, wherein the value of $|\phi t \cdot \Delta t|$ is equal to or less than $$m \cdot \frac{\lambda 0}{8}$$

of the predetermined wavelength.

2. A diffractive optical element having diffraction gratings formed by a plurality of layers made of at least two kinds of materials of different dispersions to enhance diffraction efficiency of a design order over a wavelength region, wherein at least one of the plurality of layers is made of a plastic resin material, wherein, a rate of change in refractive index due to temperature variation of the material of the L-th layer is dnoL/dt, a thickness of the diffraction grating formed by the L-th layer is dL, and wherein said diffractive optical element satisfies the following conditions:

$\phi t = (dno1/dt)d1 \pm (dno2/dt)d2 \pm \ldots \pm (dnoL/dt)dL$ $\Delta t = 30$ degrees wherein m is the design order, $\lambda 0$ is a predetermined wavelength in the wavelength region, and $\phi t$ is a sum of values obtained by multiplying the rates of change in refractive index due to temperature variation $\Delta t$ by the grating thickness of each diffraction gratings, wherein the value of $|\phi t \cdot \Delta t|$ is equal to or less than $$m \cdot \frac{\lambda 0}{8}$$

of the predetermined wavelength.

3. A diffractive optical element according to claim 1 or 2, wherein said diffraction gratings include a diffraction grating in which a thickness thereof within one period monotonically decreases in one direction and a diffraction grating in which a thickness thereof within one period monotonically increases in the one direction.

4. A diffractive optical element according to claim 3, wherein, among the plurality of layers, if said diffractive optical element has an optical shape formed to monotonically increase the thickness within one period, at least one dispersion of the materials of the layer formed to monotonically decrease the thickness is larger than at least one dispersion of the materials of the layer formed to monotonically increase the thickness.

5. A diffractive optical element according to claim 3, wherein, among the plurality of layers, if said diffractive optical element has an optical shape formed to monotonically decrease the thickness within one period, at least one dispersion of the materials of the layer formed to monotonically increase the thickness is larger than at least one dispersion of the materials of the layer formed to monotonically decrease the thickness.

6. A diffractive optical element according to claim 1 or 2, wherein said wavelength region is a visible spectrum.

7. A diffractive optical element according to claim 1 or 2, wherein the plurality of layers are laminated on a base plate, and a layer which is in contact with the base plate, among the plurality of layers, is made of the same material as that of the base plate.

8. An optical system having a diffractive optical element according to one of claim 1 or 2.

9. An optical system according to claim 8, wherein said optical system is an image forming optical system.

10. An optical system according to claim 8, wherein said optical system is an observation optical system.

11. An optical system apparatus or an electronic apparatus having an optical system according to claim 8.

* * * * *

UNITED STATES PATENT AND TRADEMARK OFFICE
CERTIFICATE OF CORRECTION

PATENT NO.    : 6,480,332 B1
DATED         : November 12, 2002
INVENTOR(S)   : Takehiko Nakai It is certified that error appears in the above-identified patent and that said Letters Patent is hereby corrected as shown below:

Column 2,
Line 17, "+first order" should read -- ± first order --.

Column 6,
Line 67, "sin(nx)/nx" should read -- sin($\pi$x)/$\pi$x --.

Column 8,
Lines 21-22, "m$\lambda$
               0" should read -- m$\lambda$0 --.

Column 15,
Line 25, "10" should read -- $\lambda$0 --.

Column 16,
Line 2, "gratings" should read -- grating --.

Signed and Sealed this

Nineteenth Day of August, 2003

JAMES E. ROGAN
*Director of the United States Patent and Trademark Office*